United States Patent [19]

Aoyagi et al.

[11] Patent Number: 5,757,585
[45] Date of Patent: May 26, 1998

[54] METHOD FOR BONDING LEADS TO A SLIDER IN A DISK DRIVE INTEGRATED SUSPENSION ASSEMBLY

[75] Inventors: Akihiko Aoyagi, Fujisawa, Japan; Satya Prakash Arya, San Jose, Calif.; A. David Erpelding, San Jose, Calif.; Victor Wing Chun Shum, San Jose, Calif.

[73] Assignee: International Business Machines Corporation, Armonk, N.Y.

[21] Appl. No.: 729,970

[22] Filed: Oct. 15, 1996

[51] Int. Cl.⁶ ............................................ G11B 5/48
[52] U.S. Cl. ............................................. 360/104
[58] Field of Search ............................ 360/104, 103

[56] References Cited

U.S. PATENT DOCUMENTS

| | | | |
|---|---|---|---|
| 3,786,457 | 1/1974 | Kahn | 340/174.1 |
| 4,141,050 | 2/1979 | Wiseley | 360/104 |
| 4,759,119 | 7/1988 | Noguchi et al. | 29/603 |
| 4,761,699 | 8/1988 | Ainslie et al. | 360/103 |
| 4,764,831 | 8/1988 | Patel | 360/105 |
| 4,789,914 | 12/1988 | Ainslie et al. | 360/103 |
| 4,792,875 | 12/1988 | Ohdaira | 360/104 |
| 4,991,045 | 2/1991 | Oberg | 360/104 |
| 4,996,623 | 2/1991 | Erpelding et al. | 360/104 |
| 5,027,239 | 6/1991 | Hagen | 360/104 |
| 5,079,659 | 1/1992 | Hagen | 360/104 |
| 5,115,363 | 5/1992 | Khan et al. | 360/104 |
| 5,185,683 | 2/1993 | Oberg et al. | 360/104 |
| 5,311,384 | 5/1994 | Johnson | 360/104 |
| 5,333,085 | 7/1994 | Prentice et al. | 360/104 |
| 5,392,179 | 2/1995 | Sendoda | 360/104 |
| 5,428,489 | 6/1995 | Takamure et al. | 360/104 |
| 5,493,463 | 2/1996 | Hagen | 360/104 |
| 5,530,604 | 6/1996 | Pattanaik | 360/104 |

*Primary Examiner*—John H. Wolff
*Attorney, Agent, or Firm*—Noreen A. Krall

[57] ABSTRACT

The present invention accommodates, in an integrated suspension assembly for a magnetic disk storage system, tolerances in the lead and slider position in a manner to maintain gimbal integrity, minimize static attitude variation and reduce stress build up in the lead. In one aspect of the present invention, the nominal lead position and slider position are chosen such that the distance between them in an overlapping interference manner is no more than (a+b), the sum of the extreme tolerance a of the lead position and extreme tolerance b of the slider position. This is to ensure at least line to line contact between the slider and the leads, in an interference type contact configuration. In another aspect of the present invention, the ends of the leads are coated with a layer of solder material which can be reflowed to form a solder joint bonding the contacting leads to the slider. In another aspect of the present invention, a yield interference design is implemented wherein the leads are pre-bent to an extent and positioned such that the lead material goes beyond yield point during subsequent interference lead termination. This would minimize variation of slider static attitude from one part to another after slider to lead termination. Further, the leads may be pre-bent with a slight S-shaped section for accommodating such further bending. Similarly for a clearance type contact configuration, the leads are positioned to go beyond the material yield point during assembly. In yet a further aspect of the present invention, a solder ball may be inserted between the slider and a lead so that when the solder ball is reflowed, the clearance between the slider and the lead is taken up for minimum stress increase in the leads and minimum slider attitude change during assembly.

18 Claims, 7 Drawing Sheets

METHOD FOR BONDING LEADS TO A SLIDER IN A DISK DRIVE INTEGRATED SUSPENSION ASSEMBLY

BACKGROUND OF THE INVENTION

1. Field of the Invention

The present invention relates to a slider-suspension assembly for a magnetic storage system, and more particularly to the lead termination on a slider in an integrated suspension assembly of a magnetic disk storage system.

2. Description of the Related Art

Magnetic disk drives are information storage devices which utilize at least one rotatable disk with concentric data tracks containing the information, a head (or "transducer") for reading data from or writing data to the various tracks, and a head positioning actuator connected to the head for moving it to the desired track and maintaining it over the track centerline during read or write operations. The transducer is attached to an air-bearing slider which is supported adjacent the data surface of the disk by a cushion of air generated by the rotating disk. The slider is mounted on a support arm of the head positioning actuator by means of a suspension. With the push for higher recording densities, it is desirable to format the disk surface with narrower data tracks and narrower inter-track spacings in order to pack more data tracks on a given area of the disk surface, and to accurately and repeatedly position the slider with respect to the disk surface such that the densely packed data tracks can be accessed with tight tolerance in slider/track alignment.

The suspension provides dimensional stability between the slider and actuator arm, and controlled flexibility in slight vertical as well as pitch and roll motions (gimbaled motions) of the slider during its relative motion above the rotating magnetic disk surface. The suspension generally comprises a load beam, which is mounted to an actuator arm of the head positioning actuator, and a flexure element supported by the load beam which supports the slider. The load beam provides a resilient spring action which biases the slider toward the surface of the disk, while the flexure provides flexibility for the slider as the slider rides a cushion of air in close proximity against the rotating disk.

In the past, various suspension structures have been proposed. For those suspensions having flexures with integrated conductor leads for making electrical connections to the sliders mounted thereon, they are sometimes referred to as integrated suspension assemblies. An integrated suspension assembly offers a relatively light weight, low profile structure for high capacity disk drive systems. An example of an integrated suspension assembly is disclosed in the commonly assigned U.S. patent application Ser. No. 08/644,878, filed on May 10, 1996 (IBM Docket No. SA996027). In this assembly, the slider is mounted on a novel low stiffness gimbal assembly for maximum flexibility of the slider to ride over surface irregularities on the magnetic disk surface and to maintain close tracking of the data tracks. For manufacturability reasons, the ends of the leads terminating on the slider are pre-bent.

In the past, owing to manufacturing tolerances accumulation from one operation to another (for example in pre-bending of the leads, the bonding of the bent leads to the slider, and/or the positioning of the slider relative to the leads), it has been found that the leads may not come into contact with the lead termination pads on the slider when the slider and leads are positioned in their nominal position. Further, residual stresses are inevitably introduced in the leads during the termination process. These residual stresses result in forces (e.g. a torque) on the slider which can negatively affect its static alignment (e.g. in static attitude, such as pitch angle) and effective distance relative to the disk surface. The residual forces can also affect free gimbaling of the slider during disk drive operation, and can cause separation in the gimbal structure. While systematic effects of the residual stresses may be easier to compensate to some extent, random variations in such effects would be more difficult to compensate. In view of the fact that cumulative manufacturing tolerances can extend over a certain range, the actual variation from nominal design specification for each piece of finished integrated suspension assembly can differ significantly, thus leading to inconsistent performance of the suspension assemblies and poor yield rate.

It becomes a challenge to design an approach for attaching the leads to the slider which can accommodate assembly tolerances and minimize variations in residual stresses and the negative effects thereof on the finished assemblies.

SUMMARY OF THE INVENTION

The present invention accommodates assembly tolerances in the lead and slider position in a manner to maintain gimbal integrity, minimize static attitude variation and reduce stress build up in the lead. In one aspect of the present invention, the nominal lead position and slider position are chosen such that the distance between them in an overlapping interference manner is at least (a+b), the sum of the extreme tolerance a of the lead position and extreme tolerance b of the slider position. This is to ensure at least line to line contact between the slider and the leads, in an interference type contact configuration. In another aspect of the present invention, a yield interference design is implemented wherein the leads are pre-bent to an extent and positioned such that the lead material goes beyond yield point during subsequent interference lead termination. This would minimize variation of slider static attitude from one part to another after slider to lead termination. Further, the leads may be pre-bent with a slight S-shaped section for accommodating large interferences. Similarly for a yield clearance type contact configuration, the leads are pre-bent and positioned such that the material would go beyond yield point during subsequent slider to lead termination. In yet a further aspect of the present invention, a solder ball may be inserted between the slider and a lead so that when the solder ball is reflowed, the clearance between the slider and the lead is taken up to minimize slider static attitude change after termination.

DESCRIPTION OF THE ILLUSTRATED EMBODIMENTS

The present description is for illustrative purpose and should not be taken in a limiting sense. The scope of the present invention can best be determined from the appended claims. For example, although the present invention is described in reference to a magnetic disk storage system and in particular one which implements a slider containing a magnetoresistive ("MR") sensor, it will be apparent that the invention may be implemented in other magnetic storage systems including recording systems such as a magnetic tape recording system or other applications which could take advantage of the lead termination approaches disclosed herein.

Figure 1:
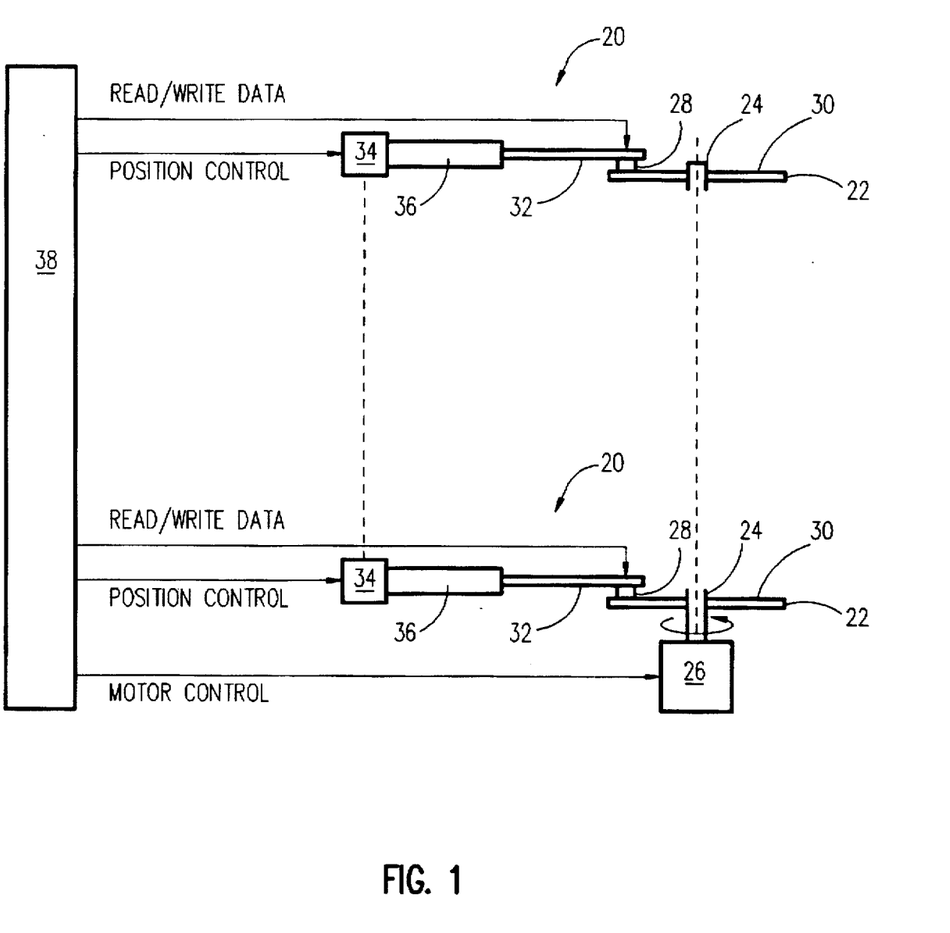
FIG. 1 is a schematic/block diagram of a magnetic disk storage system having an integrated suspension assembly in which the slider and the leads are bonded in accordance with the present invention.

FIG. 1 illustrates a simplified schematic block diagram of a magnetic disk storage system 20 embodying the present invention. The magnetic disk storage system 20 comprises at least one rotatable magnetic disk 22 which is supported on a spindle 24 and rotated by a disk drive motor 26, and at least one slider 28 positioned in close proximity to the magnetic recording media at the disk surface 30. Data is stored in the magnetic recording media on each disk 22 in the form of an annular pattern of concentric data tracks (not shown). Each slider 28 contains one or more magnetic transducers (not shown). The slider 28 is mounted to an integrated suspension assembly 32 which is connected to an actuator means 34 by way of an actuator arm 36. As the disk 22 rotates, the slider 28 is controlled to move across the disk surface 30 by the actuator means 36 so that the slider 28 may access different portions of the disk surface 30 where desired data is recorded or read. The integrated suspension assembly 32 provides a slight spring force which biases the slider 28 against the disk surface 30 and controls flexibility in slight vertical as well as roll and pitch movements of the slider 28 relative to the rotating disk surface 30. The actuator means as shown in FIG. 1 may be a voice coil motor (VCM), for example. The various components of the magnetic disk storage system 20 are controlled in operation by control signals generated by control unit 38, such as for control of the actuator means 34, drive motor 26 and reading/writing data.

Figure 2:
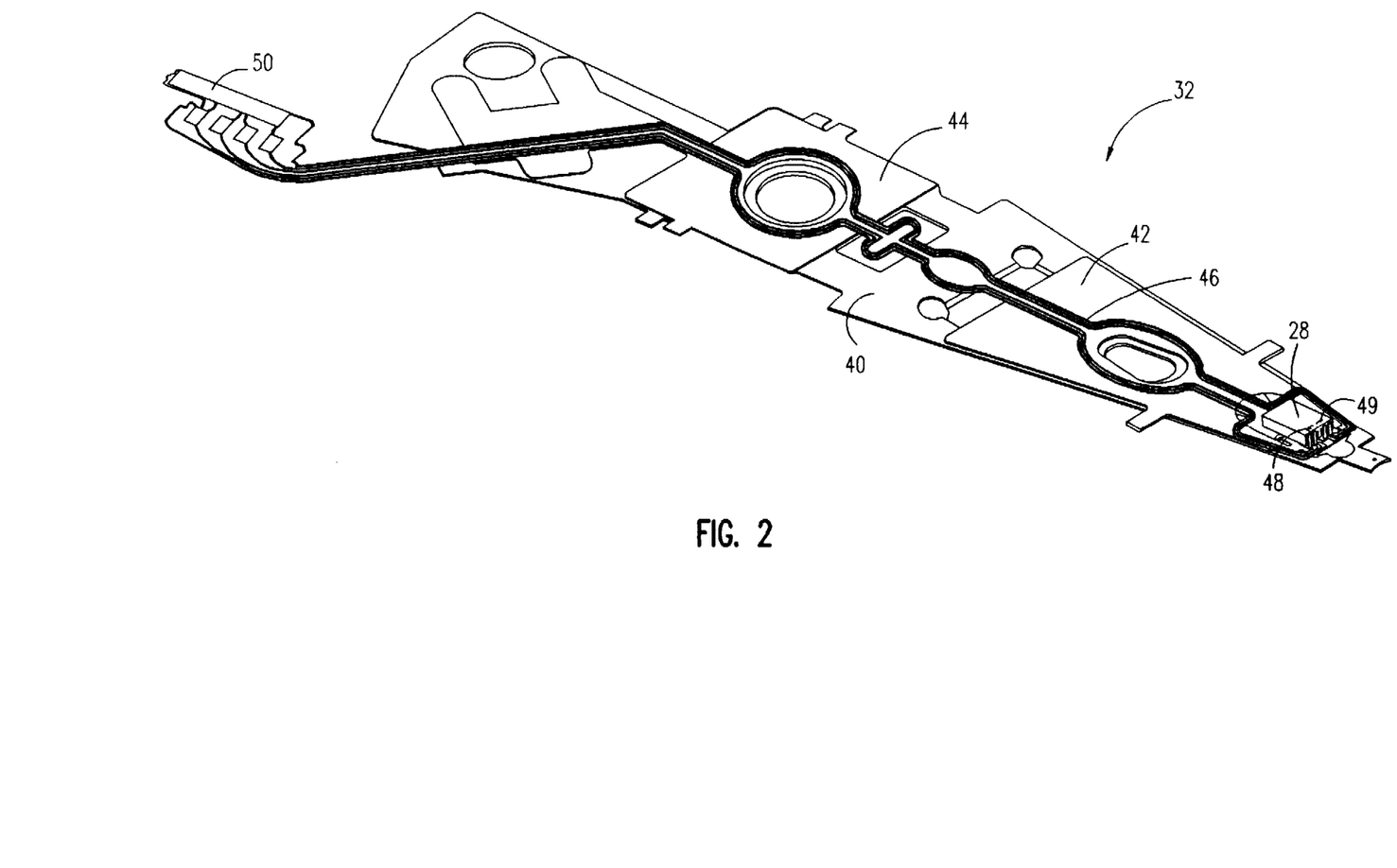
FIG. 2 is a perspective view of an integrated suspension assembly in which the present invention is implemented.

FIG. 2 is a perspective view of the integrated suspension assembly 32. The actuator arm 36 pivotally supports the integrated suspension assembly 32 about a spindle (not shown) of the actuator means 34 in the disk drive system 20. The primary pieces of the integrated suspension assembly 32 include a load beam 40, a flexure 42 and a mount plate 44. One end of the load beam 40 is fixedly attached to the actuator arm 34 using the mount plate 44, and the other end supports on its surface the flexure 42. The flexure 42 has integrated conductor leads 46 or traces on its surface separated by a layer of dielectric material 47. The slider 28 is bonded to the tip end of the flexure 42. The slider 28 may be of the type which contains an integrated MR read sensor 48 and inductive write transducer 49. (The read sensor and write transducer are schematically depicted by dotted lines in the figures for illustrative purpose only. The actual sizes and locations of these components differ from what are shown, which do not affect the understanding of the present invention herein.) The mount plate 44 supports the ends of the leads 46. The leads terminate at one end at the slider 28 and at the other end in a multiconnector 50 on the mount plate 44 for electrically connecting to the electronics of the control unit 38 via a flex cable (not shown).

Figure 3:
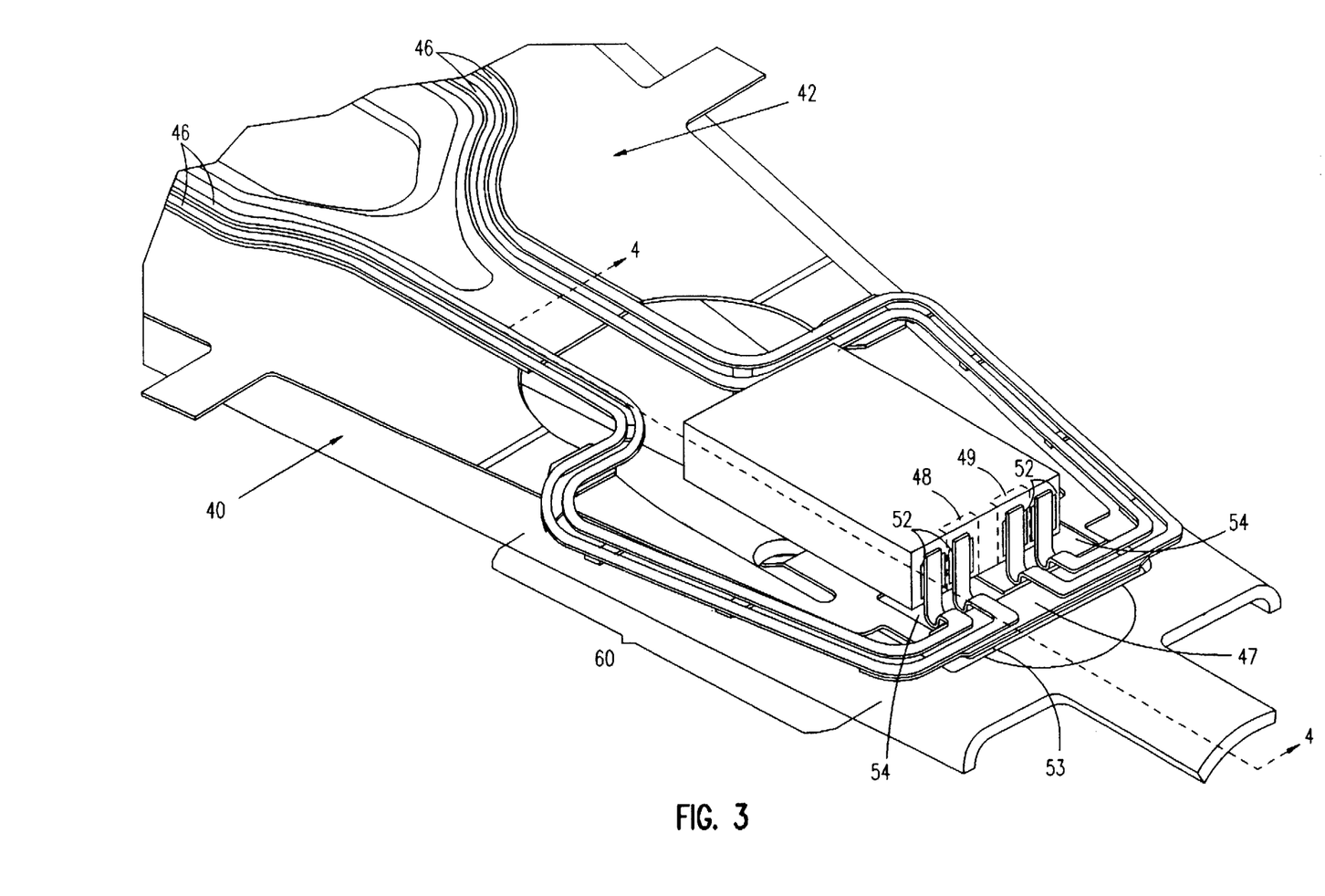
FIG. 3 is a perspective view of the slider region of the integrated suspension assembly shown in FIG. 2.
Figure 4:
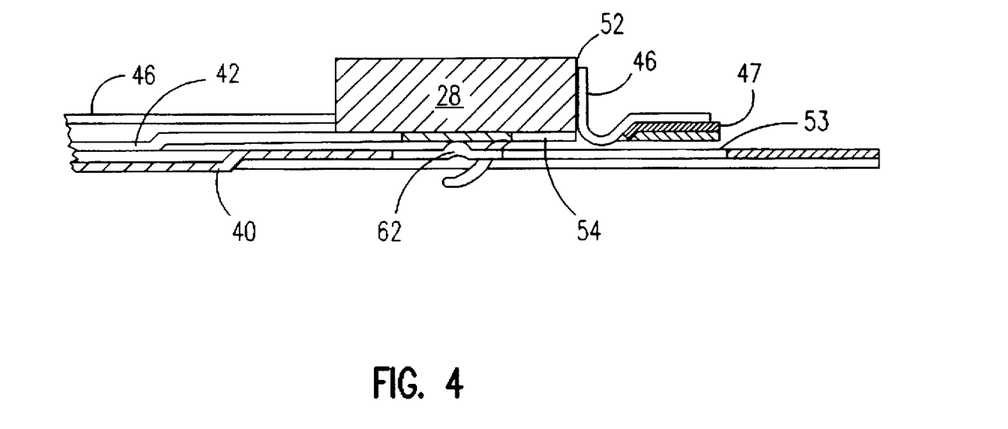
FIG. 4 is a sectional view taken along line 4—4 in FIG. 3.

FIG. 3 more clearly illustrates the slider region on the flexure 42. The leads 46 terminate on the contact pads 52 on the end face of the slider 28; one pair of the leads being in electrical connection with the MR read sensor 48, and the other pair of leads being in electrical connection with the write transducer 49. The lead terminations may be bonded to the slider pads 52 by conventional ultrasonic bonding processes or soldering. It is noted that the leads 46 are bent at their ends so that they can be positioned with a flat surface of sufficient area against the pads 52 for bonding thereto. The leads 46 may be bent before or after the flexure 42 has been attached to the load beam 40. If the latter, the aperture 53 in the load beam 40 and apertures 54 in the flexure 42 provide access for forming the bent lead terminations. Also, these apertures 53 and 54 provide access to the slider so that it can be rigidly held during bonding (e.g., by ultrasonic bonding operation) of the leads 46 to the slider contact pads 52.

The flexure 42 is structured and attached to the load beam 40 in a manner as to provide the desired gimbal motions. Specifically, the section 60 of the flexure 42 with the slider 28 thereon is not fixedly attached to the load beam 40, but is biased by the resiliency of the flexure to rest against a gimbal pivot 62 on the load beam 40. Other details of the integrated suspension assembly are disclosed in U.S. patent application Ser. No. 08/644,878, filed on May 10, 1996 (IBM Docket No. SA996027), which details are hereby incorporated by reference herein but are omitted herein so as not to obscure the disclosure of the present invention.

Figure 5A:
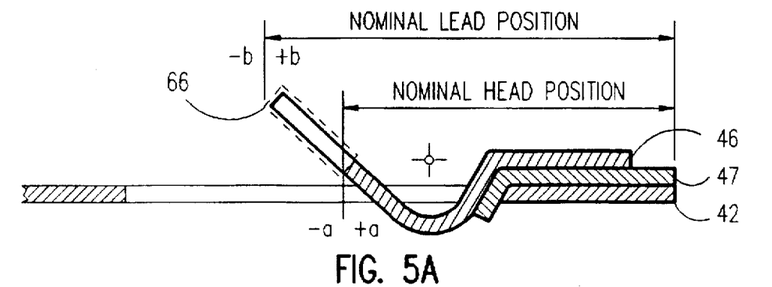
FIG. 5A to 5D are sectional views of the lead termination region illustrating the positional tolerances of the slider and lead for interference design.

In accordance with one aspect of the present invention, the positional tolerances of the leads and slider are taken into consideration to ensure at least line to line contact of the leads to the slider. There are tolerances in both the position of the lead 46 ("lead position") and the position of the slider 28 ("slider position") on the integrated suspension assembly 32. The respective tolerance ranges for the lead position and the slider position are shown in FIG. 5A. For the slider position, its tolerance range is +a to −a as shown. For the lead position, its tolerance is +b to −b as shown. It is noted that the reference to slider position tolerance herein includes any cumulative tolerances in slider size, its relative position on the suspension assembly, and any other dimensional factors of the slider or the suspension assembly which can cumulatively affect the location of the end of the slider to which the leads are to be attached. For purpose of the present invention, the slider position tolerance herein more specifically refers to the position of the end of the slider to which the leads are to be attached. Similarly, the reference to lead tolerance herein includes any cumulative tolerances in lead size, bending geometry, its relative position on the suspension assembly, and any other dimensional factors of the lead or the suspension assembly which can cumulatively affect the location of the tip of the lead. For purpose of the present invention, the lead position tolerance herein more specifically refers to the position of the lead tip. The exact slider position and lead position tolerances depend on the specific assembly process undertaken. They may be determined by one skilled in the art using samples taken from assembly processes.

For an interference-design approach, the lead 46 should be positioned or bent to position the tip of the lead at a nominal position such that the lead would remain in contact with the slider 28 within the entire tolerance range of the lead position. From the perspective of slider and lead line to line contact (interference=0), the worst case tolerance is when the lead position is at +b and the slider position is at −a. As a result, to account for the worst case tolerances and ensure at least line to line contact of the lead to the slider, the distance between the nominal position of the slider and the nominal position of the lead (as measured from a common referenced point on the flexure 42 is shown in FIG. 5A), and should be equal to or less than a+b. The tolerance range of the positions of the slider touching or overlapping of those of the lead.

Figure 5B:
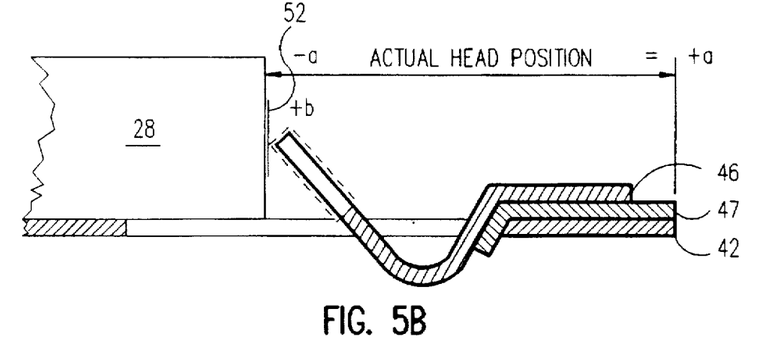

Specifically, in the event that the actual slider position is at −a and the actual lead position is at +b as shown in FIG. 5B (minimum interference=0), the lead 46 would still be in line to line contact with the slider. Should the lead position be at anywhere within the range of −b and +b about nominal, the slider at position −a would be in contact with the lead. The maximum interference is 2b; and the nominal interference is b.

Figure 5C:
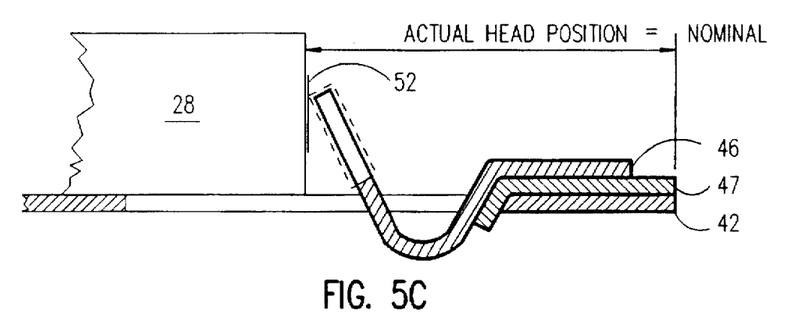

In FIG. 5C, in the event the slider 28 is actually at the nominal slider position, the leads would be bent more to accommodate the slider 28 regardless of the actual lead position. The nominal interference is (a+b) at nominal lead position; and the range of interference is a to (a+2b).

Figure 5D:
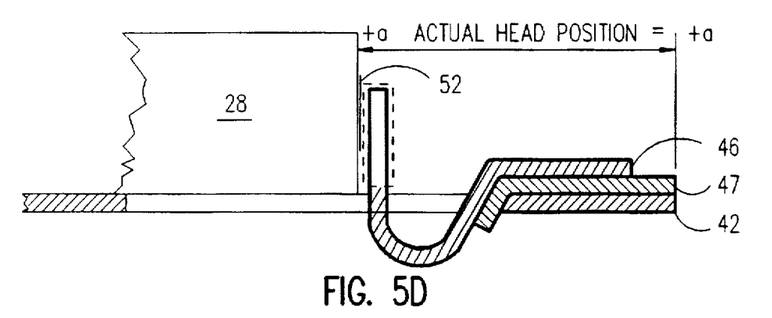

In FIG. 5D, in the event the actual slider position is at +a, which obviously would allow the lead 46 to come into contact with the slider 28 as the lead bends further regardless of the actual lead position. The nominal interference at nominal lead position would be (2a+b), with a range of interference of 2a to (2a+2b).

In view of the foregoing, it can be seen that the overall range of interference within the lead and slider position tolerances is between (2a+2b) and zero.

The leads 42 may be bonded to the slider contact pads 52 by any one of a number of ways, including soldering, ultrasonic bonding, conductive epoxying, etc.

As was discussed in the Background section herein, residual stresses affect the static attitude of the slider on its gimbal and/or the free movement of its gimbal. These residual stresses in the leads are to a great extent the result of tolerance accumulation in positioning the slider with respect to the leads, bonding of the leads on the slider, and/or prebending of the leads. In accordance with a further aspect of the present invention, residual stresses can be substantially made of same magnitude from one part to another (i.e., thus rendering the effects of residual stresses systematic) by overbending the leads in the manner described herein below.

Basically, the lead is over-bent in such a manner and to such an extent that the bending stress at at least a section in the bend would go beyond the yield point of the lead material during subsequent lead to slider termination. When the yield point has been reached, further bending of the leads (as may become necessary depending on the relative positioning of the slider and leads) would be in the plastic flow regime of the lead material. Accordingly, changes in stress due to further bending are very small. As a result, the influence of stresses arising from lead bending would be near constant, which can be systematically compensated before or after assembly of the integrated suspension assemblies. In this regard, a tolerance c is built into the lead position tolerance, where c is the minimum bending distance during subsequent lead to slider termination that is necessary for leads to reach yield point. In other words, at the position tolerance +b, there is a distance c such that b'=b+c where b' is the position tolerance of the lead for over-bending prior to subsequent lead to slider termination using the yield interference approach. It is noted that when the yield interference is provided for the minimum interference situation (where the actual slider position is at −a in FIG. 5A), the yield interference would necessarily be accomplished for the other interference situations discussed in reference to FIG. 5C and 5D. The nominal position of the lead should be at (a+b) or (a+b'+c) distance from the nominal slider position.

Thus, in order to accommodate the minimum tolerance (worst case tolerance) situation with slider position at −a, the lead 46 should be bent to lead position +(b−c) about its nominal. Subsequent lead to slider termination would push the lead to bend by a distance c This bending would create minimum additional stress necessary for the lead material to past its yield point. In the event that the actual slider and lead positions are as shown in FIGS. 5C and 5D, the lead will be bent even further, again with minimum additional stress in the lead material past yield point.

It is understood that while the tolerance c is built into the position tolerance b of the lead, it can instead be built into the slider position a. In other words, the positional tolerances described herein characterize the relative positions of the slider and lead.

It is noted that the angled straight region of the lead material may not pass its yield point. It is the curvature area of the bend or section(s) thereof where yield point will be exceeded. Generally, the smaller the curvature, the earlier it will reach the yield point.

Figure 7:
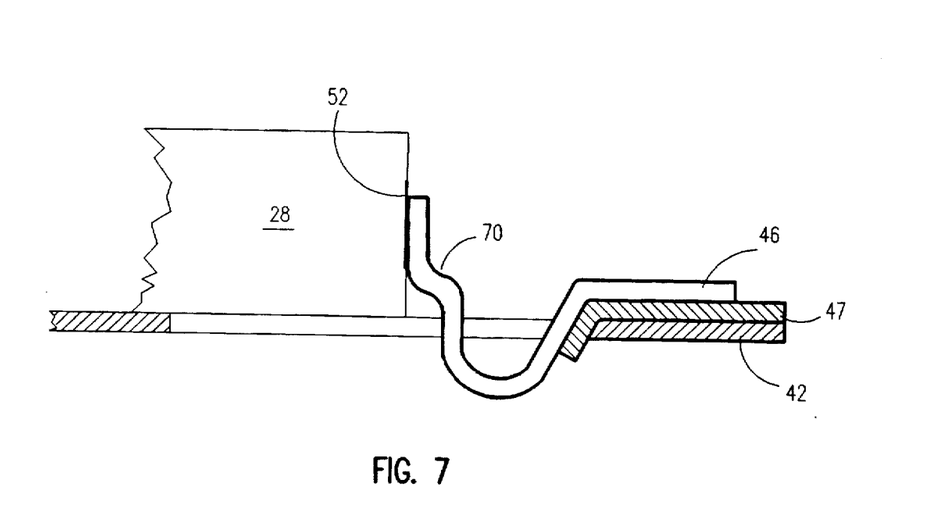
FIG. 7 is a sectional view illustrating an S-shaped bend in the lead, to accommodate large interferences.

FIG. 7 illustrates a over-bent lead configuration which is useful to a large interference contact approach. The lead 46 is pre-bent with a slight S-shaped bend 70. The S-shaped bend 70 defines two regions of relative bending curvatures to eliminate possibility of lower curvature (bend) contacting the slider prior to full lead movement. Depending on the extent of the interference with the slider, upper curvature of the lead (near to lead end) would tend to straighten first, followed by the lower curvature of the S-shaped bend 70. It can be appreciated that the S-shaped bend 70 also provides a more vertical lead end for a flatter contact with the slider contact pads 52. This improves the bonding of the lead to the slider.

Figure 8:
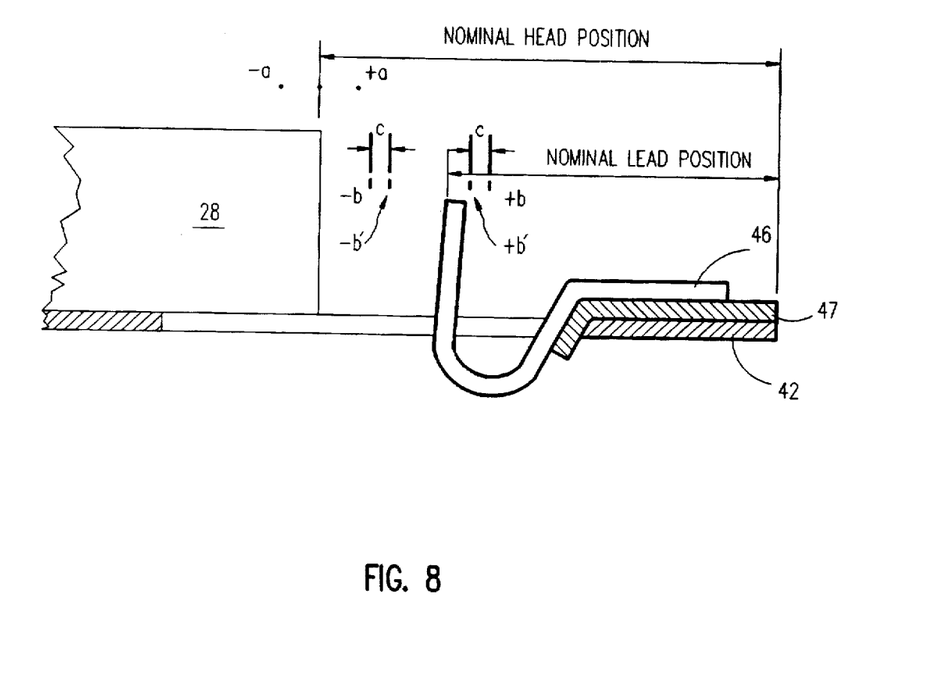
FIG. 8 is a sectional view of the lead termination region illustrating the positional tolerances of the slider and lead in a "yield" clearance design.

There may be integrated suspension assembly designs where a yield clearance contact approach would be desirable. Referring now to FIG. 8, a yield clearance contact is one in which the slider and the lead are not in contact at least in their respective nominal positions, and at most in line to line contact with no interference. Depending on the actual slider and lead positions, the over-bent lead need to be further bent towards the slider 28 in order to make contact with the slider contact pad (i.e., to take up the clearance between the slider and the lead). To ensure minimum variation of stress from part to part, the lead should be over-bent to a lead position +b' to −b' (i.e., +(b−c) to −(b−c)) within its tolerance range +b to −b with its nominal position at a distance (a+b) or (a+b'+c) from the slider nominal position, to ensure that the material reaches its yield point during termination, for the same reasons as in the interference contact situation. It is noted that once the lead material has past its yield point during termination, any bending of the lead towards the slider would he in its plastic flow regime. While FIG. 8 shows the lead over-bent to greater than 90 degrees from the horizontal, clearance contact may be formed using leads bent by less than 90 degrees. It is noted that in order to ensure a clearance contact where the lead does not touch the slider, the distance between the nominal lead position and slider position should be more than (a+b+c), where the tolerance range of positions of the slider should not overlap those of the lead.

The S-shaped bend illustrated and described in connection with FIG. 7 can also be applied to a clearance-contact approach. It is noted that the "S" bend in the lead is inverted with respect to the slider such that the upper curvature of the lead (nearer the lead end) tends to straighten first as the lead is bent towards the slider for bonding.

Figure 9:
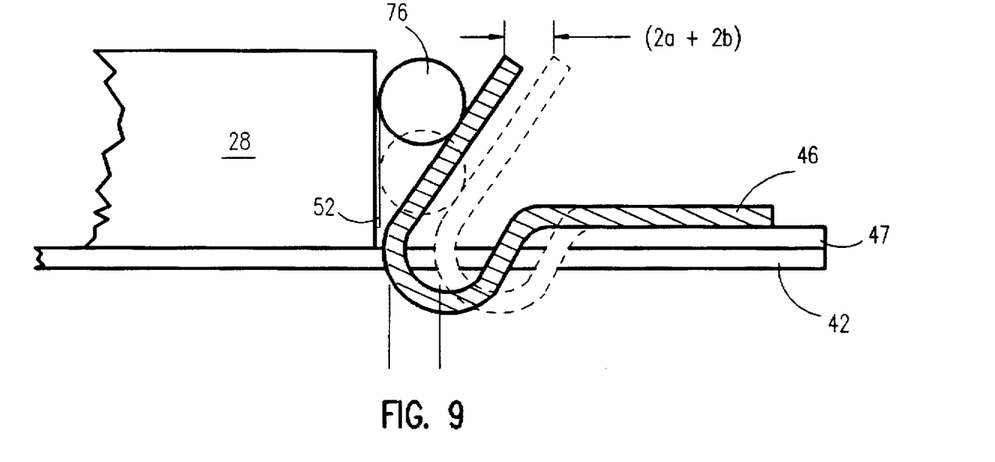
FIG. 9 is a sectional view illustrating the use of a solder ball to form a solder joint in a clearance contact design for minimum or no stress in the leads.

Referring now to FIG. 9, a novel slider/lead soldering method is described for a clearance contact configuration where the lead has been pre-bent more than 90 degrees, which method does not require further bending of the lead 46 to make contact with the slider contact pads prior to bonding thereto. Given a tolerance in the spacing between the pre-bent lead 46 and the slider 28, a solder ball 76 of slightly larger diameter is dropped into the space between the lead and the slider. Subsequent reflow of the solder ball 76 would result in a solderjoint. For example, for a maximum spacing tolerance of (2a+2b), a solder ball diameter of about 1.25 (2a+2b) may be used effectively to accomplish the above. The optimum size of the solder ball 76 to be used can be easily determined by one skilled in the art without undue experimentation given the disclosure of the present invention, which would depend on factors such as solder material, reflow temperature, dimension of the leads, area and geometry of the slider contact pads, etc. It is noted that preferably the lead 46 should be over-bent past its material yield point to have close to constant stress in all leads. When the solder ball is dropped on to the over-bent lead, it may further bend the lead a little, but would not create significant addition stress in the process as the lead material has past its yield point.

Figure 10:
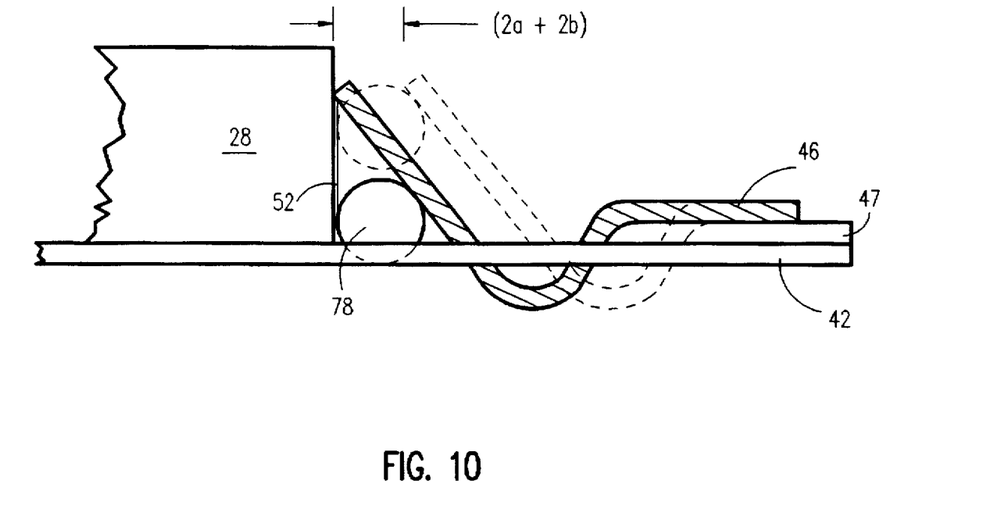
FIG. 10 is a sectional view illustrating the use of a solder ball to form a solder joint in another clearance contact design for minimum or no stress in the leads.

FIG. 10 shows a variation of the preceding embodiment, for the situation where the lead is over-bent to a lesser degree, but may pass its material yield point. A solder ball 78 is inserted under (in the perspective shown in the figure) the lead which will be held in place by the lead against the contact pad 52. The same considerations for selecting the size of the solder ball discussed above are also applicable here. Reflow of the solder ball 78 result in a solder joint.

The concepts of the present invention have been described in reference to a single lead. It is understood that the same concepts apply to the other lead terminations on the slider.

Figure 6A:
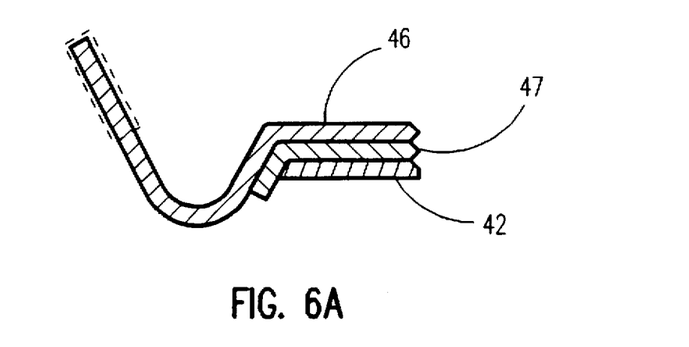
FIGS. 6A and 6B are sectional views illustrating solder reflow at the lead termination in accordance with one aspect of the present invention.
Figure 6B:
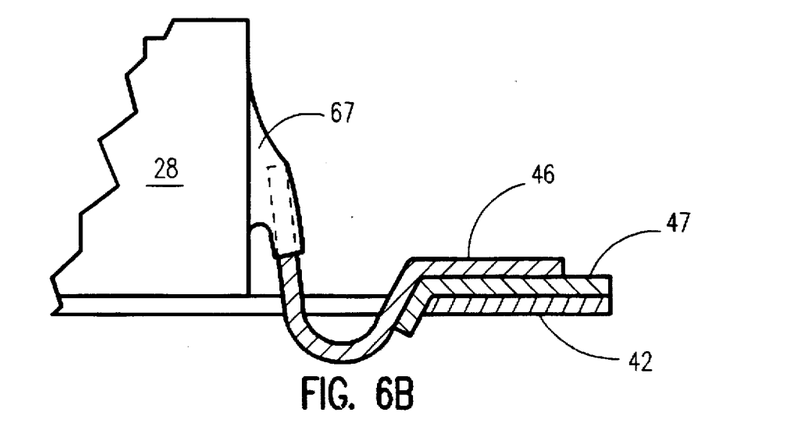

In accordance with another aspect of the present invention, a novel soldering process is designed to complement the lead to slider termination in accordance with the interference design described above. Referring to FIG. 6A, prior to assembly, the end of the lead is plated with a layer of suitable solder material (for example, one containing eutectic Sn-Pb of 10 microns thick). The contact pad 52 on the slider may be coated with a layer of the same material, gold or any other suitable material to facilitate solder contact. The solder 66 is reflowed after the slider and lead are positioned on the integrated suspension assembly. To reflow the solder, a focused beam of heat from a suitable heat source is directed at the edge of the bent lead where it makes contact with the slider pad 52. As the solder 66 liquefies, it forms a fillet 67 at the contact point, as shown in FIG. 6B. Surface tension of the molten solder pulls the solder from the outer extremities of the bent lead 46 and slider pad 52, and thus fills in the irregularities between the bent lead 46 and the slider pad 52.

The preferred approach for reflowing the solder is to utilize a laser. When the solder is made molten by a laser impinging directly on it, there is no need to use flux. Also, the liquification and solidification of the solder is sufficiently fast as to inhibit the formation of intermetallics. This is important if the metallurgy for the slider termination pads is plated with a material different from the solder (e.g., gold). It would also allow for any gold plating on the traces to remain under the solder and allow for some cost savings in the integrated suspension assembly process. While solder reflow using a laser is preferred, any other method of solder reflow which is not detrimental to the magnetic element on the slider is acceptable. The specific amount or thickness of the solder 66 depends on factors such as the type of solder material, the reflow temperature, the spacing between the lead and the slider pad, etc., which can be determined by one skilled in the art without undue experimentation.

While the present invention has been particularly shown and described with reference to the illustrated embodiments thereof, it will be understood by those skilled in the art that various changes in form and detail may be made therein without departing from the spirit, scope and teaching of the invention. Accordingly, the invention herein disclosed is to be considered merely as illustrative and limited in scope only as specified in the appended claims.

We claim:

1. In an integrated suspension assembly including a slider and a multilayer flexure having an integrated lead formed in plane thereon, a method of bonding the slider and the lead, comprising the steps of:

determining a position tolerance range (−a to +a) of the slider relative to a nominal position of the slider;

determining a position tolerance range (−b to +b) of the lead relative to a nominal position of the lead;

bending the integrated conductive lead at the slider end of the multilayer flexure out of the plane of the flexure so that the end of conductive lead extends in a direction perpendicular to the flexure and is unsupported by the flexure:

plating the unsupported end of the conductive lead with solder material;

plating contact pads on the surface of the slider proximate the lead with a solder material;

positioning the slider and the lead such that the nominal position of the lead and the nominal position of the slider are at a distance at least (a+b) apart where the position tolerance ranges of the slider and the lead overlap to ensure line to line contact between the slider and the lead during assembly; and bonding the lead to the slider.

2. A method as in claim 1, further comprising the step of over bending the lead for making contact to the slider by determining a distance c by which the tolerance range of the lead may be shifted to reach a yield point of the material.

3. A method as in claim 2, wherein the bend in the integrated lead at the slider end of the multilayer flexure is stepped upward towards the slider.

4. A method as in claim 1 wherein the bonding step includes the step of reflowing the solder to create a solder joint between the slider and the lead.

5. In an integrated suspension assembly including a slider and multilayer flexure having an integrated lead formed thereon, a method of bonding the slider and the lead comprising the steps of:

determining a position tolerance range (−a to +a) of the slider relative to a nominal position of the slider;

determining a position tolerance range (−b to +b) of the lead relative to a nominal position of the lead;

bending the integrated conductive lead at the slider end of the multilayer flexure out of the plane of the flexure so that the end of conductive lead extends in a direction perpendicular to the flexure and is unsupported by the flexure;

plating the unsupported end of the conductive lead with solder material;

plating contact pads on the surface of the slider proximate the lead with a solder material;

positioning the slider and the lead such that the nominal position of the lead and the nominal position of the slider are at a distance more than (a+b) apart where the position tolerance ranges of the slider and the lead do not overlap; and bonding the lead to the slider.

6. A method as in claim 5 further comprising the step of over bending the lead for making contact to the slider by determining a distance c by which the tolerance range of the lead may be shifted to reach a yield point of the material.

7. A method as in claim 6 wherein the bend in the integrated lead at the slider end of the multilayer flexure is stepped upward towards the slider.

8. A method as in claim 6 wherein the bonding step includes the step of reflowing the solder to create a solder joint between the slider and the lead.

9. A method as in claim 5 wherein the bonding step includes the steps of providing a solder ball between the slider and the lead and reflowing the solder ball to create a solder joint between the slider and the lead.

10. A method of making an integrated suspension assembly, comprising the steps of:

providing a load beam;

supporting a flexure with a load beam;

supporting a magnetic slider on the slider on the flexure;

providing an integral lead on the end of the flexure for electrical connection to the slider;

determining a position tolerance range (−a to +a) of the slider relative to a nominal position of the slider;

determining a position tolerance range (−b to +b) of the lead relative to a nominal position of the lead;

bending the integral conductive lead at the slider end of the flexure out of the plane of the flexure so that the end of conductive lead extends in a direction perpendicular to the flexure and is unsupported by the flexure;

plating the unsupported end of the conductive lead with solder material;

plating contact pads on the surface of the slider proximate the lead with a solder material;

positioning the slider and the lead such that the nominal position of the lead and the nominal position of the slider are at a distance more than (a+b) apart where the position tolerance ranges of the slider and the lead do not overlap; and bonding the lead to the slider where the lead contacts the slider.

11. A method as in claim 10 wherein the bend in the integrated lead at the slider end of the flexure is stepped upward towards the slider.

12. A method as in claim 10 wherein the bonding step includes the step of reflowing the solder to create a solder joint between the slider and the lead.

13. A method of making an integrated suspension assembly, comprising the steps of:

providing a load beam;

supporting a multilayer flexure having an integrated lead formed thereon with the load beam;

supporting a magnetic slider on the flexure;

determining a position tolerance range (−a to +a) of the slider relative to a nominal position of the slider;

determining a position tolerance range (−b to +b) of the lead relative to a nominal position of the lead;

bending the integrated conductive lead at the slider end of the multilayer flexure of the plane of the flexure so that the end of conductive lead extends in a direction perpendicular to the flexure and supported by the flexure;

plating the unsupported end of the conductive lead with solder material;

plating contact pads on the surface of the slider proximate the lead with a solder material;

positioning the slider and the lead such that the nominal position of the lead and the nominal position of the slider are at a distance at least (a+b) apart where the position tolerance ranges of the slider and the lead do not overlap; and bonding the lead to the slider.

14. A method as in claim 13 wherein the bend in the integrated lead at the slider end of the flexure is stepped towards the slider.

15. A method as in claim 13 wherein the bonding step includes the step of reflowing the solder to create a solder joint between the slider and the lead.

16. A method as in claim 13 wherein the bonding step includes the steps of providing a solder ball between the slider and the lead and reflowing the solder ball to create a solder joint between the slider and the lead.

17. An integrated suspension assembly, comprising:

a load beam;

a flexure supported by the load beam;

a magnetic slider supported on the flexure;

an integral lead on the flexure for electrical connection to the slider, the lead being bend at one end out of the plane of the flexure in a direction perpendicular to the flexure;

wherein the slider has a position tolerance range (−a to +a) relative to a nominal position of the slider, and the lead has a position tolerance range (−b to +b relative to a nominal position of the lead;

and wherein the slider and the lead are positioned on the flexure such that the nominal position of the lead and the nominal position of the slider are at least (a+B) apart, where the position tolerance ranges of the slider and the lead overlap; and means for bonding the lead to the slider where the lead contacts the slider.

18. An integrated suspension assembly, comprising:

a load beam;

a flexure supported by the load beam;

a magnetic slider supported on the flexure;

an integral lead on the flexure for electrical connection to the slider, the lead being bend at one end out of the plane of the flexure in a direction perpendicular to the flexure;

wherein the slider has a position tolerance range (−a to +a) relative to a nominal position a of the slider, and the lead has a position tolerance range (−b to +b) relative to a nominal position b of the lead;

and wherein the slider and the lead are positioned on the flexure such that the nominal position of the lead and the nominal position of the slider are at a distance more than (a+b) apart, where the position tolerance ranges of the slider and the lead do not overlap; and means for bonding the lead to the slider.

* * * * *